US012712989B2

(12) United States Patent
Moriyama et al.

(10) Patent No.: US 12,712,989 B2
(45) Date of Patent: Aug. 18, 2026

(54) PROJECTION IMAGE ADJUSTMENT METHOD, INFORMATION PROCESSING DEVICE, AND NON-TRANSITORY COMPUTER-READABLE STORAGE MEDIUM STORING PROGRAM

(71) Applicant: SEIKO EPSON CORPORATION, Tokyo (JP)

(72) Inventors: Keisuke Moriyama, Azumino (JP); Kazuyoshi Kitabayashi, Azumino (JP); Toshiyuki Sakai, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 19/092,229

(22) Filed: Mar. 27, 2025

(65) Prior Publication Data

US 2025/0310497 A1 Oct. 2, 2025

(30) Foreign Application Priority Data

Mar. 28, 2024 (JP) ................................ 2024-052792

(51) Int. Cl.
*H04N 9/31* (2006.01)

(52) U.S. Cl.
CPC ......... *H04N 9/3185* (2013.01); *H04N 9/3182* (2013.01)

(58) Field of Classification Search
CPC ...... H04N 9/3185; H04N 9/3194; H04N 9/31; H04N 9/3188; H04N 9/3182; H04N 9/3191; H04N 9/317; G03B 21/147
USPC .................... 348/744–747, 806, 807; 353/69
See application file for complete search history.

(56) References Cited

U.S. PATENT DOCUMENTS

2023/0276036 A1* 8/2023 Mori .................... H04N 9/3185 348/745

FOREIGN PATENT DOCUMENTS

JP 2013-097006 A 5/2013

* cited by examiner

*Primary Examiner* — Sherrie Hsia
(74) *Attorney, Agent, or Firm* — Oliff PLC

(57) ABSTRACT

A projection image adjustment method includes: performing first processing when a first operation is accepted, the first processing including causing a projector to project a first projection image including a test pattern, acquiring, from the projector, a geometric correction value obtained by performing geometric correction on the first projection image projected on a projection surface by the projector, generating a reference pattern corresponding to a marking operation for marking an object on the projection surface appearing in the first projection image when the marking operation is accepted, and storing a relative positional relationship between the test pattern and the reference pattern, and the geometric correction value, as one data set; and performing second processing including causing the projector to project a second projection image including the reference pattern when a second operation different from the first operation is accepted.

6 Claims, 5 Drawing Sheets

START
S1
CAUSE PROJECTOR TO PROJECT FIRST PROJECTION IMAGE INCLUDING TEST PATTERN
S2
ACQUIRE GEOMETRIC CORRECTION VALUE FROM PROJECTOR
S3
GENERATE REFERENCE PATTERN CORRESPONDING TO MARKING OPERATION
S4
STORE RELATIVE POSITIONAL RELATIONSHIP BETWEEN TEST PATTERN AND REFERENCE PATTERN, AND GEOMETRIC CORRECTION VALUE, AS ONE DATA SET
END 110
120
100
140
130

PROJECTION IMAGE ADJUSTMENT METHOD, INFORMATION PROCESSING DEVICE, AND NON-TRANSITORY COMPUTER-READABLE STORAGE MEDIUM STORING PROGRAM

The present application is based on, and claims priority from JP Application Serial Number 2024-052792, filed Mar. 28, 2024, the disclosure of which is hereby incorporated by reference herein in its entirety.

BACKGROUND

1. Technical Field

The present disclosure relates to a projection image adjustment method, an information processing device, and a non-transitory computer-readable storage medium storing a program.

2. Related Art

JP-A-2013-97006 discloses that an image including a grid pattern is projected as a distortion adjustment pattern image for adjusting a distortion of an image projected on a screen, and that the distortion adjustment pattern image of the grid pattern is projected as superimposed on a display image.

JP-A-2013-97006 is an example of the related art.

According to the above-described related art, the following problem arises when a projection image without any distortion is to be displayed at a specific position on a projection surface. For example, after the projector is installed and the projection image is adjusted using the distortion adjustment pattern, the relative position between the specific position on the projection surface and the projection image is determined. Subsequently, the projector is removed and the projector is assumed to be installed again on another day. In such a case, there is a concern that the relative position between the specific position on the projection surface and the projection image cannot be aligned simply by adjusting the projection image using the distortion adjustment pattern. Also, there is a concern that the work load of the user increases during the alignment of the projector.

SUMMARY

According to an aspect of the present disclosure, a projection image adjustment method includes: performing first processing when a first operation is received, the first processing including causing a projector to project a first projection image including a test pattern, acquiring, from the projector, a geometric correction value obtained by performing geometric correction on the first projection image projected on a projection surface by the projector, generating a reference pattern corresponding to a marking operation for marking an object on the projection surface appearing in the first projection image when the marking operation is received, and storing a relative positional relationship between the test pattern and the reference pattern, and the geometric correction value, as one data set; and performing second processing including causing the projector to project a second projection image including the reference pattern when a second operation different from the first operation is received.

According to another aspect of the present disclosure, an information processing device includes: an input device that receives an input operation; and a control device that executes first processing when a first operation is received via the input device, the first processing including causing a projector to project a first projection image including a test pattern, acquiring, from the projector, a geometric correction value obtained by performing geometric correction on the first projection image projected on a projection surface by the projector, generating a reference pattern corresponding to a marking operation for marking an object on the projection surface appearing in the first projection image when the marking operation is received, and storing a relative positional relationship between the test pattern and the reference pattern, and the geometric correction value, as one data set, and second processing including causing the projector to project a second projection image including the reference pattern when a second operation different from the first operation is received via the input device.

According to still another aspect of the present disclosure, a non-transitory computer-readable storage medium storing a program is provided, the program causing a computer to execute: first processing when a first operation is received, the first processing including causing a projector to project a first projection image including a test pattern, acquiring, from the projector, a geometric correction value obtained by performing geometric correction on the first projection image projected on a projection surface by the projector, generating a reference pattern corresponding to a marking operation for marking an object on the projection surface appearing in the first projection image when the marking operation is received, and storing a relative positional relationship between the test pattern and the reference pattern, and the geometric correction value, as one data set; and second processing including causing the projector to project a second projection image including the reference pattern when a second operation different from the first operation is received.

DESCRIPTION OF EMBODIMENTS

Figure 1:
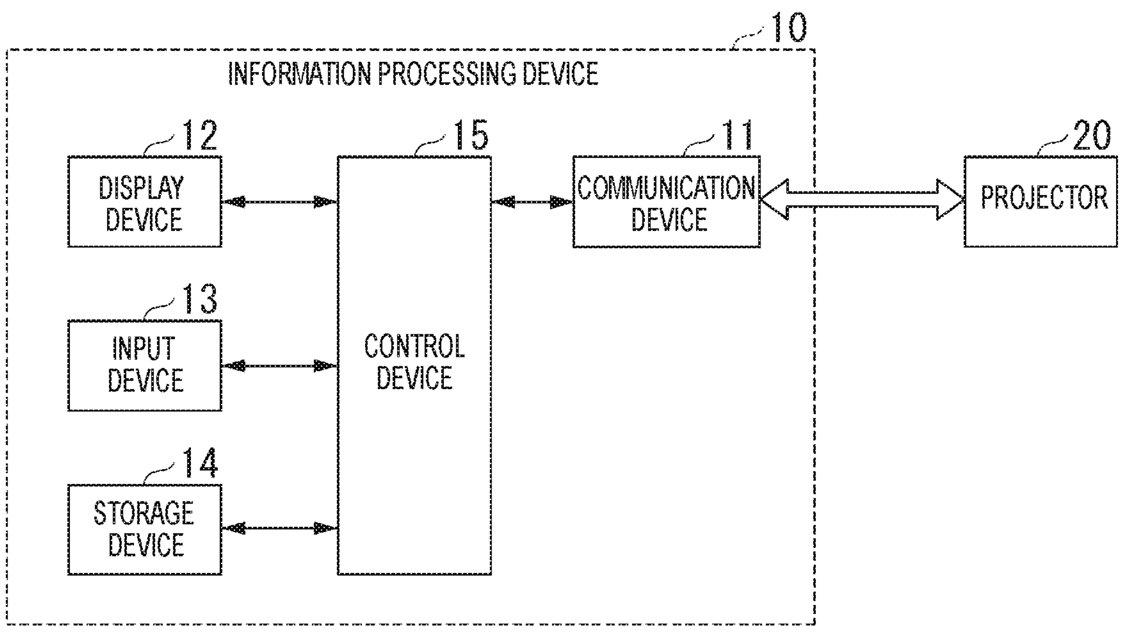
FIG. 1 is a block diagram showing a schematic configuration of an information processing device according to an embodiment.

An embodiment of the present disclosure will now be described with reference to the drawings.

In the drawings described below, elements may be illustrated at different dimensional scales in order to clarify the elements.

FIG. 1 is a block diagram illustrating a schematic configuration of an information processing device 10 according to the present embodiment. The information processing device 10 supplies an image signal to a projector 20. For example, the information processing device 10 is a laptop PC (personal computer). The projector 20 is, for example, a liquid crystal projector, and projects an image based on an image signal supplied from the information processing device 10. The information processing device 10 includes a communication device 11, a display device 12, an input device 13, a storage device 14, and a control device 15.

The communication device 11 is a communication interface circuit that controls communication performed between the control device 15 and the projector 20. The communication device 11 transmits an image signal to the projector 20 via an HDMI (High-Definition Multimedia Interface: registered trademark) cable. The communication device 11 also transmits a signal other than the image signal to the projector 20 via a USB (Universal Serial Bus) cable or a wireless LAN (Local Area Network).

The display device 12 displays an image based on an image signal input from the control device 15. For example, the display device 12 is a liquid crystal panel or an organic electro-luminescence (EL) panel. In the description below, in order to distinguish between an image projected on a projection surface by the projector 20 and an image displayed on the display device 12, the image projected on the projection surface by the projector 20 is referred to as a "projection image", and the image displayed on the display device 12 is referred to as a "display image".

The input device 13 is a device that receives a user's input operation on the information processing device 10. For example, the input device 13 includes a keyboard and a mouse. The input device 13 outputs a signal corresponding to the operation received from the user to the control device 15.

The storage device 14 includes a nonvolatile memory that stores a program necessary for causing the control device 15 to execute various processing, various setting data, and the like, and a volatile memory that is used as a location for temporary saving of data when the control device 15 executes various processing. For example, the nonvolatile memory is an EEPROM (electrically erasable programmable read-only memory) or a flash memory and the like. The volatile memory is, for example, a RAM (random-access memory) and the like.

The control device 15 is an arithmetic processing device that controls the overall operation of the information processing device 10 in accordance with a program stored in the storage device 14. For example, the control device 15 is configured with one or a plurality of processors such as a CPU (central processing unit). A part or all of the functions of the control device 15 may be configured with a circuit such as a DSP (digital signal processor), an ASIC (application-specific integrated circuit), a PLD (programmable logic device), or an FPGA (field-programmable gate array). The control device 15 executes various kinds of processing in parallel or in sequence.

Figure 2:
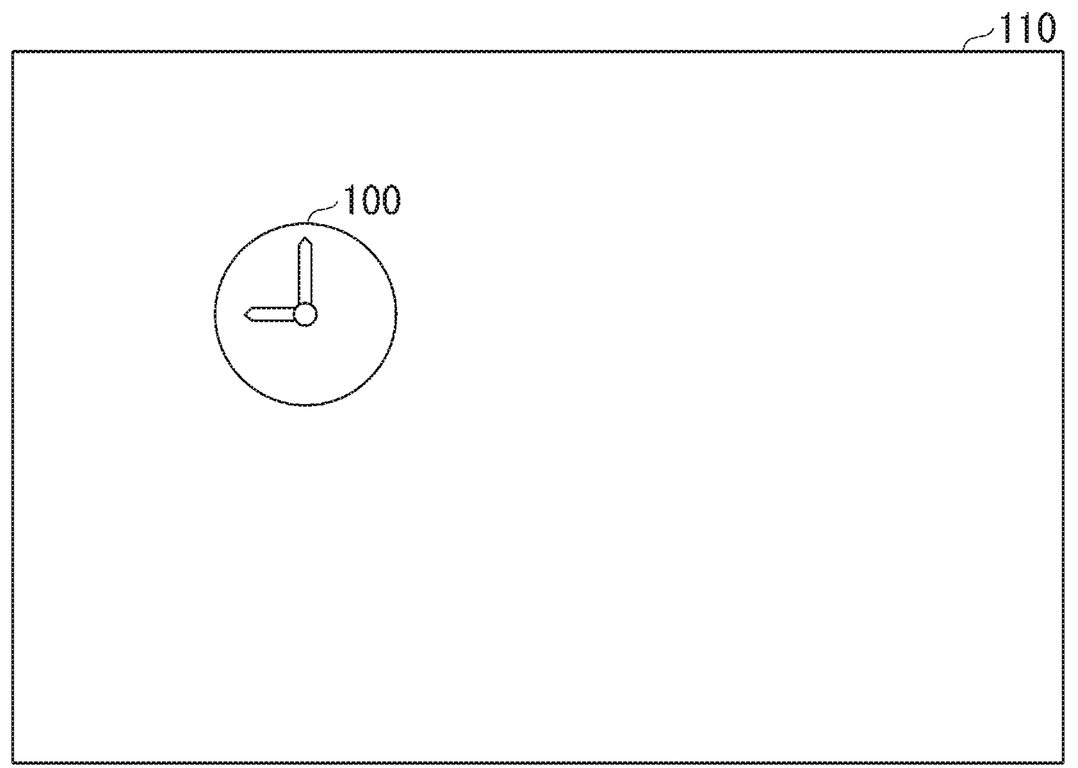
FIG. 2 shows a state of a projection surface on which a projection image is projected by a projector.

FIG. 2 shows a state of a projection surface on which a projection image is projected by the projector 20. Hereinafter, the operation of the information processing device 10 will be described on the assumption that a projection image including a character image is projected on a wall surface 110 on which a timepiece 100 is installed, as shown in FIG. 2.

The user installs the projector 20 so that the projection image is projected on the wall surface 110 as described above, and subsequently performs a first operation using the input device 13 of the information processing device 10. The first operation is an operation that triggers the control device 15 to execute first processing, described later. The content of the first operation is not particularly limited, but the first operation may be, for example, an operation such as clicking a specific icon provided in the display image displayed on the display device 12.

Figures 3, 4:
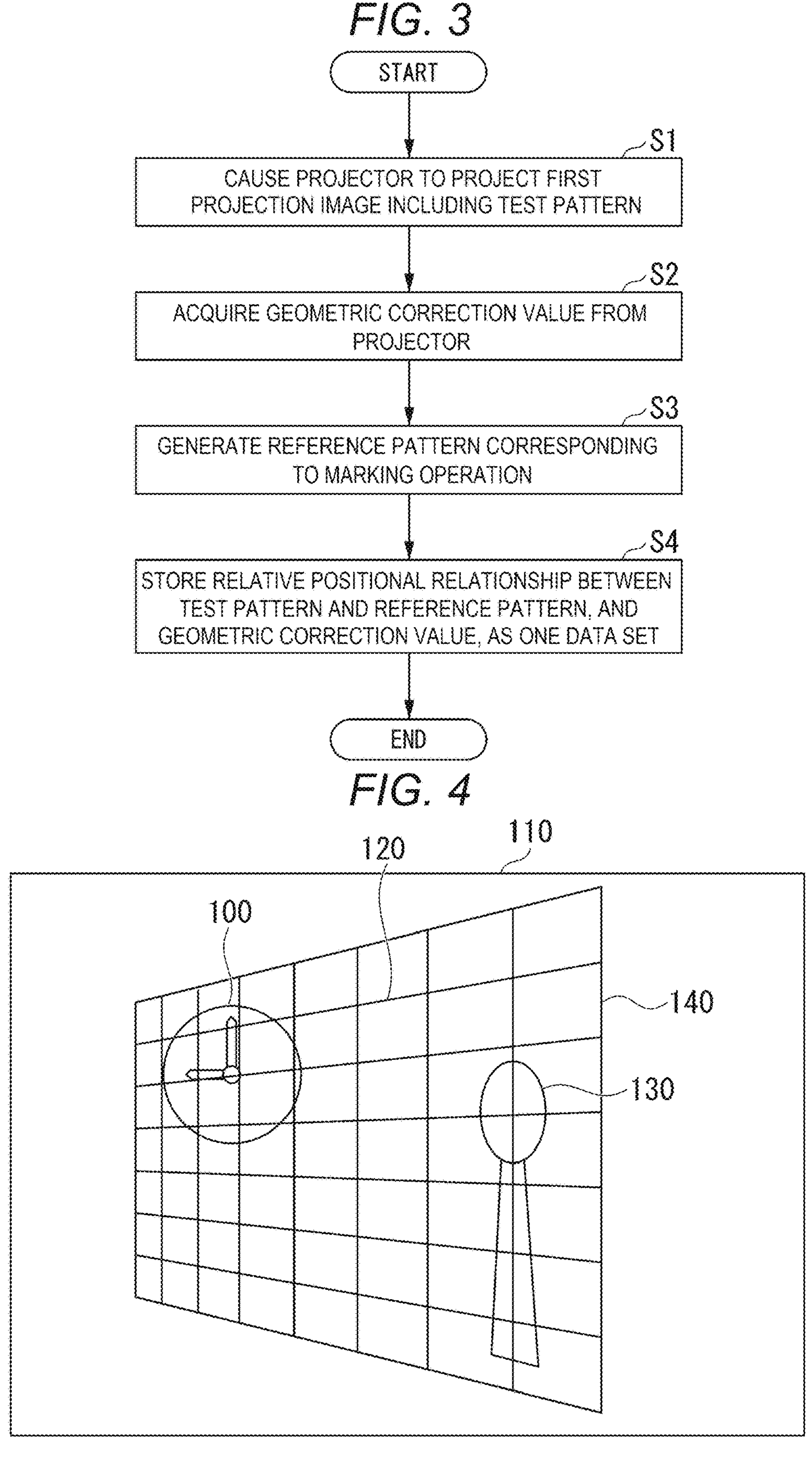
FIG. 3 is a flowchart showing first processing executed when a control device receives a first operation via an input device.
FIG. 4 shows an initial state of a first projection image projected on a wall surface by the projector.

FIG. 3 is a flowchart showing the first processing executed by the control device 15 when receiving the first operation via the input device 13. The control device 15 executes a program stored in the storage device 14 and thus executes the first processing shown in FIG. 3.

As shown in FIG. 3, the control device 15 causes the projector 20 to project a first projection image 140 including a test pattern 120 and a character image 130 (step S1). Specifically, the control device 15 transmits a first image signal representing the first projection image 140 including the test pattern 120 and the character image 130 to the projector 20 via the communication device 11.

Upon receiving the first image signal from the information processing device 10, the projector 20 projects the first projection image 140 based on the first image signal onto the wall surface 110. FIG. 4 shows the initial state of the first projection image 140 projected on the wall surface 110 by the projector 20. As shown in FIG. 4, the first projection image 140 includes the test pattern 120 and the character image 130. For example, the test pattern 120 is a grid pattern. The character image 130 is not particularly limited.

In many cases, the first projection image 140 projected on the wall surface 110 has a distortion such as a keystone distortion depending on the installation state of the projector 20, as shown in FIG. 4. Therefore, the user manually performs geometric correction so that the first projection image 140 projected on the wall surface 110 becomes a rectangular image, by using a geometric correction function such as a keystone correction function of the projector 20. Since the test pattern 120 provided in the first projection image 140 is a grid pattern, the user can easily perform geometric correction.

Figure 5:
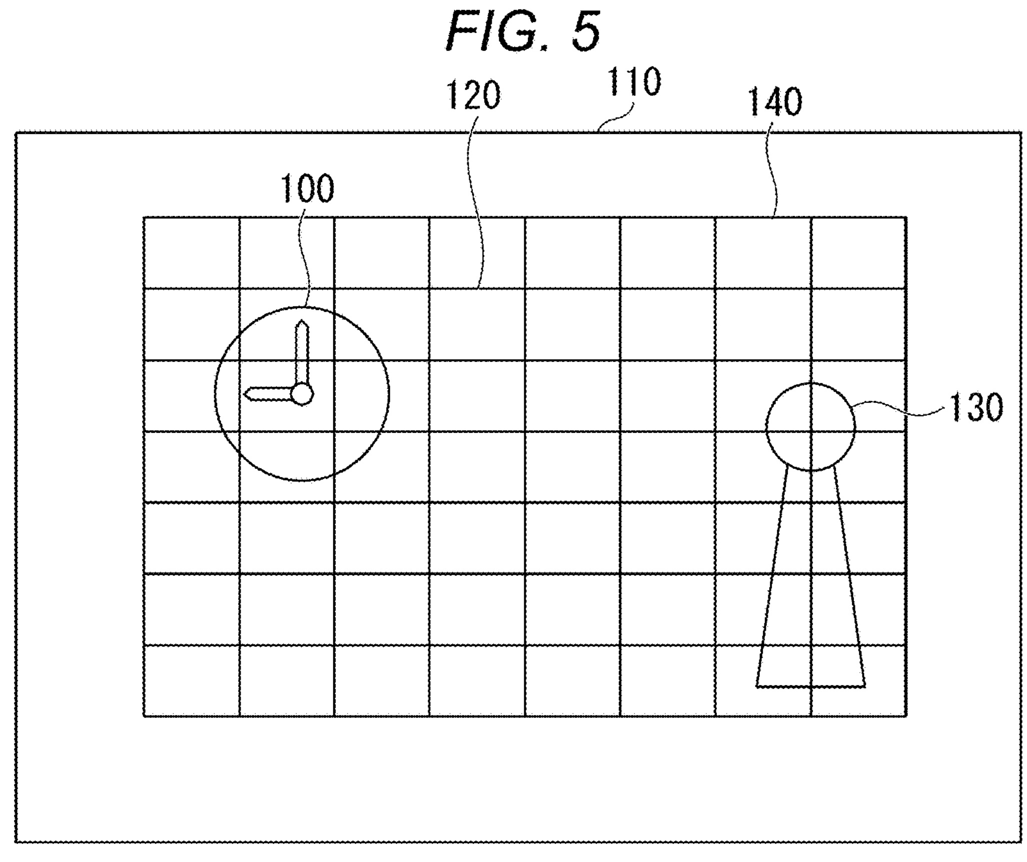
FIG. 5 shows the first projection image after geometric correction.

FIG. 5 shows the first projection image 140 after the geometric correction. As shown in FIG. 5, the first projection image 140 after the geometric correction is a rectangular image. On completion of the geometric correction, the projector 20 saves a geometric correction value obtained by performing the geometric correction in the memory of the projector 20. The geometric correction value is data for correcting pixel coordinates included in the image signal so that the projection image projected on the wall surface 110 by the projector 20 in the future becomes a rectangular image.

As shown in FIG. 3, after executing step S1, the control device 15 acquires the geometric correction value obtained by performing the geometric correction on the first projection image 140 projected by the projector 20, from the projector 20 via the communication device 11 (step S2).

Subsequently, when a marking operation of marking an object on the wall surface 110 appearing in the first projection image 140 is received via the input device 13, the control device 15 generates a reference pattern 150 corresponding to the marking operation (step S3). For example, after the completion of the geometric correction, the user performs marking on the timepiece 100, which is an object on the wall surface 110 appearing in the first projection image 140 after the geometric correction, by using the input device 13 of the information processing device 10.

Figure 6:
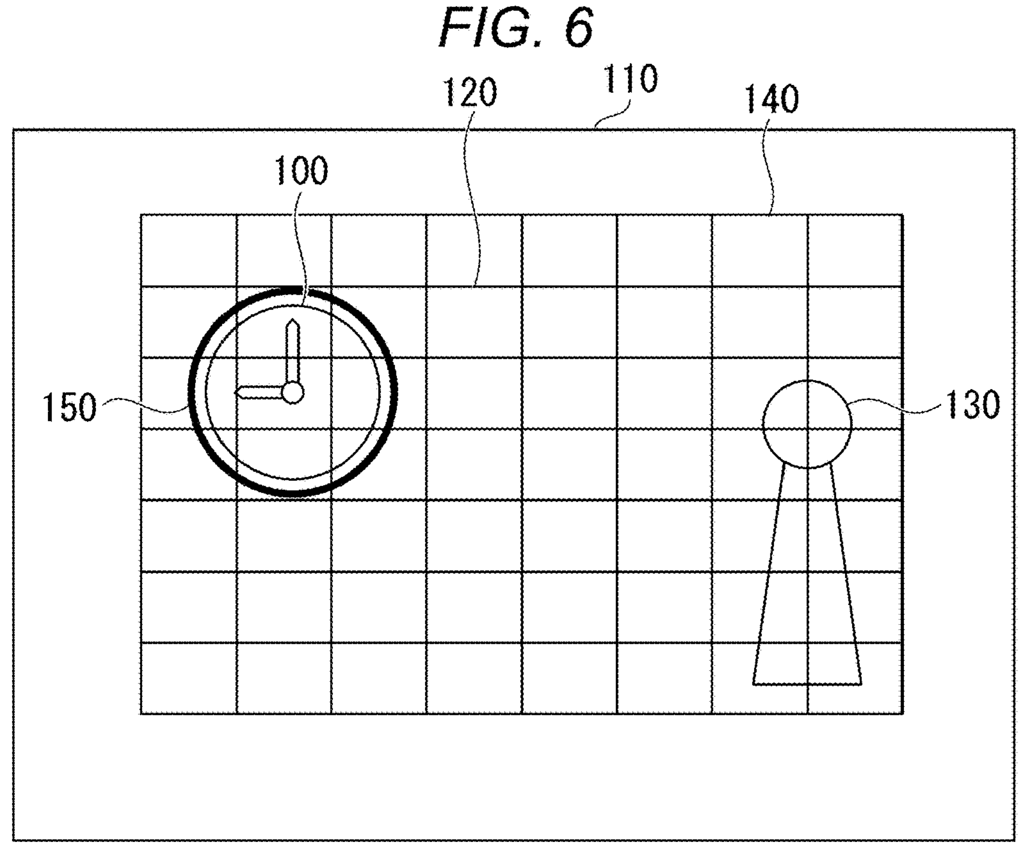
FIG. 6 shows a reference pattern generated by the control device when a user performs marking so as to surround a timepiece appearing in the first projection image with a circle.

FIG. 6 shows the reference pattern 150 generated by the control device 15 when the user performs marking so as to surround the timepiece 100 appearing in the first projection image 140 with a circle. As shown in FIG. 6, when the user performs marking so as to surround the timepiece 100 appearing in the first projection image 140 with a circle, the control device 15 generates the circular reference pattern 150 surrounding the timepiece 100.

After generating the reference pattern 150 as described above, the control device 15 stores the relative positional relationship between the test pattern 120 and the reference pattern 150, and the geometric correction value acquired from the projector 20, as one data set in the storage device 14 (step S4).

The first processing executed by the control device 15 when the first operation is received via the input device 13 is described above.

Subsequently, it is assumed that the projector 20 is removed by the user after the first processing as described above is executed, and that the user reinstalls the projector 20 later and performs a second operation different from the first operation, using the input device 13 of the information processing device 10, so that the projection image is projected on the wall surface 110. The second operation is an operation that triggers the control device 15 to execute second processing, described later. The content of the second operation is not particularly limited, but the second operation may be, for example, an operation such as clicking a specific icon provided in the display image displayed on the display device 12.

Figure 7:
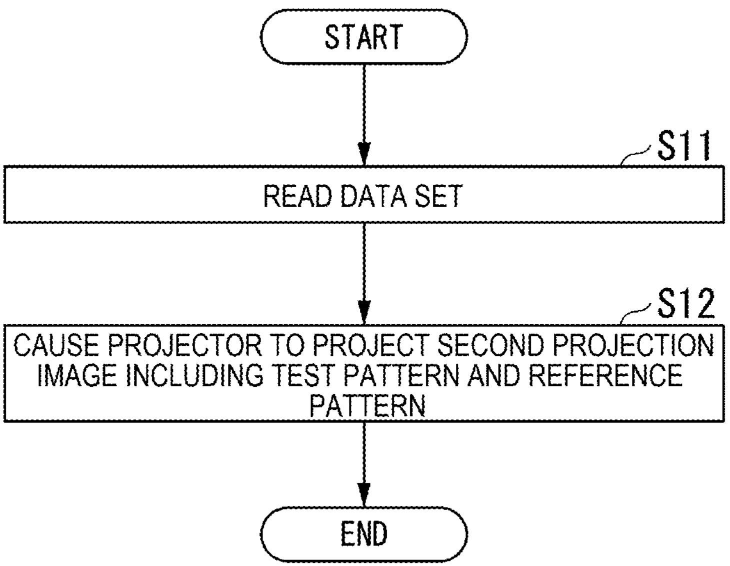
FIG. 7 is a flowchart showing second processing executed when the control device receives a second operation via the input device.

FIG. 7 is a flowchart showing the second processing executed by the control device 15 when receiving the second operation via the input device 13. The control device 15 executes a program stored in the storage device 14 and thus executes the second processing shown in FIG. 7.

As illustrated in FIG. 7, the control device 15 reads the data set stored in the storage device 14 when the first processing is executed, from the storage device 14 (step S11). Then, the control device 15 causes the projector 20 to project a second projection image 160 including the test pattern 120, the reference pattern 150, and the character image 130 (step S12). Specifically, the control device 15 transmits a second image signal representing the second projection image 160 including the test pattern 120, the reference pattern 150, and the character image 130 to the projector 20 via the communication device 11. The control device 15 also transmits the geometric correction value acquired during the execution of the first processing, to the projector 20 via the communication device 11.

Figure 8:
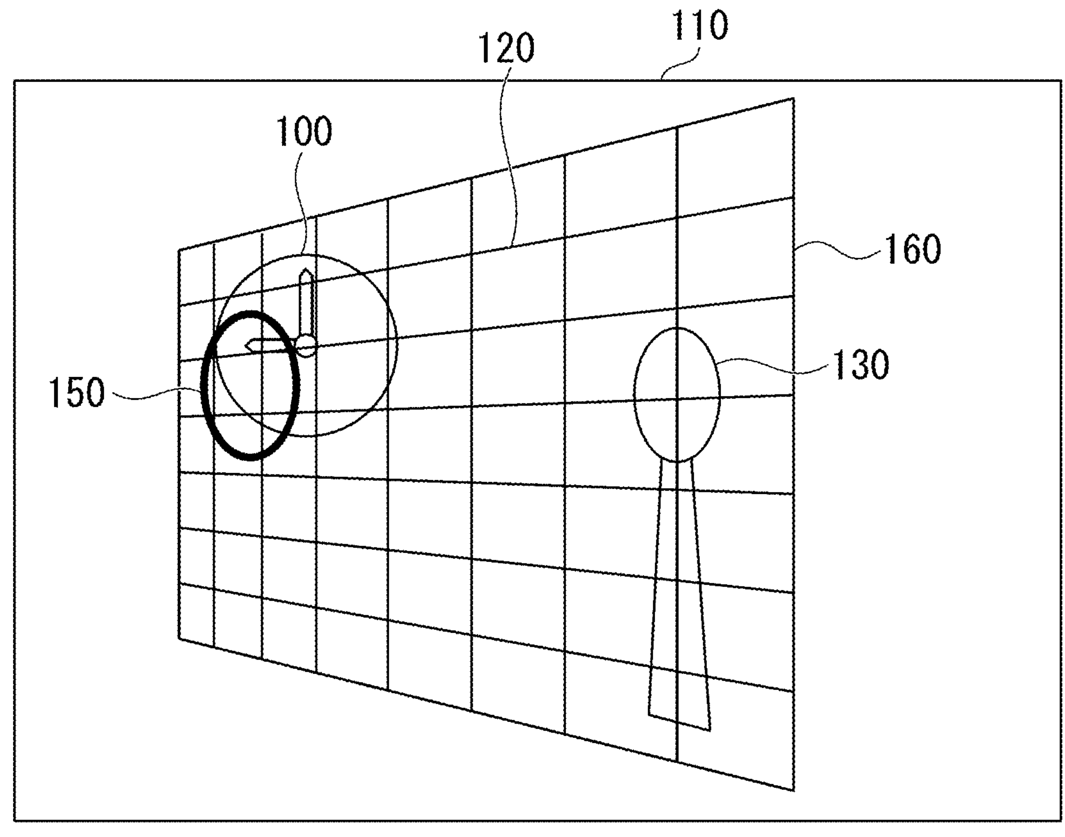
FIG. 8 shows an initial state of a second projection image projected on the wall surface by the projector.

Upon receiving the second image signal from the information processing device 10, the projector 20 projects the second projection image 160 based on the second image signal onto the wall surface 110. FIG. 8 shows the initial state of the second projection image 160 projected on the wall surface 110 by the projector 20. As shown in FIG. 8, the second projection image 160 includes the test pattern 120, the reference pattern 150, and the character image 130. The color of the reference pattern 150 is different from the color of the area other than reference pattern 150 in the area disposed in the second projection image 160.

As shown in FIG. 8, even when the projector 20 is reinstalled, in many cases, the second projection image 160 projected on the wall surface 110 has a distortion such as a keystone distortion depending on the installation state of the projector 20. Therefore, the projector 20 executes geometric correction processing. The geometric correction processing includes, for example, a step in which the projector 20 acquires the geometric correction value stored in the storage device 14, a step in which the projector 20 generates a signal obtained by correcting the first projection image 140, based on the geometric correction value, and a step in which the projector 20 projects the first projection image 140 after the geometric correction value onto the wall surface 110, based on the signal. Also, the user may manually perform the geometric correction so that the first projection image 140 projected on the wall surface 110 becomes a rectangular image, by using the geometric correction function such as the keystone correction function provided to the projector 20, or the projector 20 may acquire the geometric correction value stored in the memory of the projector 20.

Figure 9:
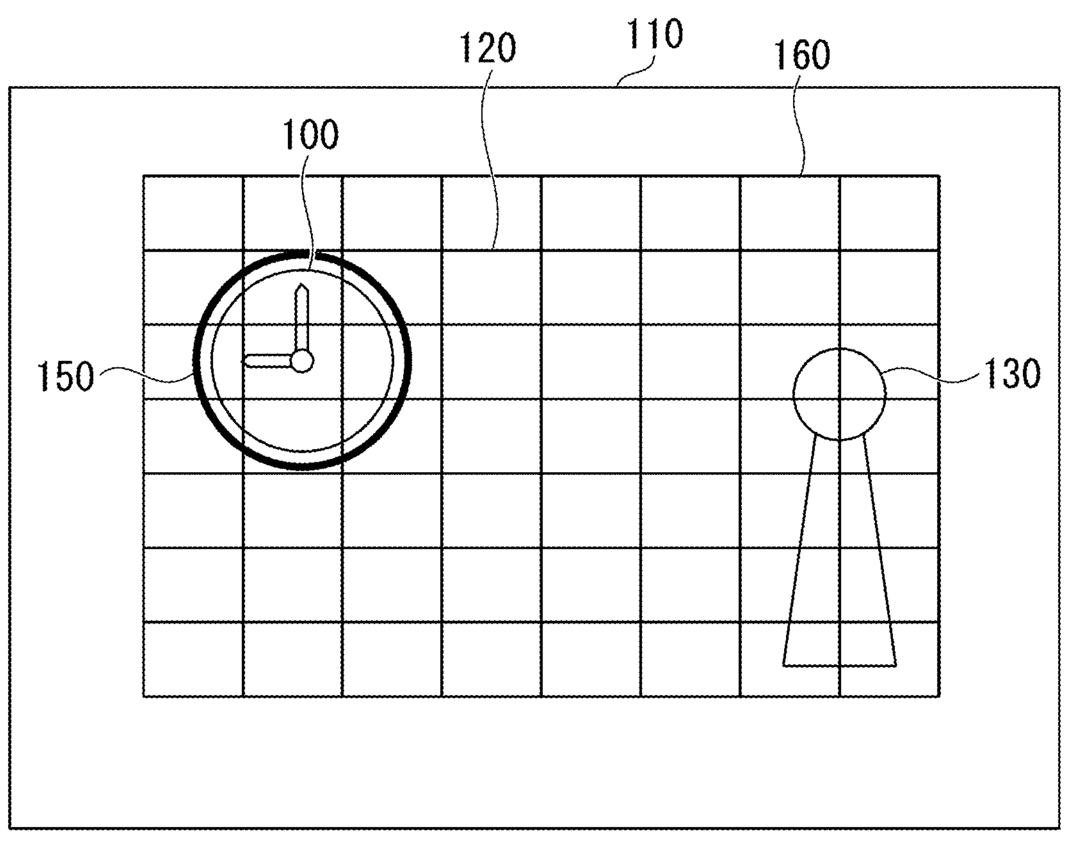
FIG. 9 shows the second projection image after the user performs position adjustment so that the timepiece is located inside the reference pattern.

Moreover, when performing the geometric correction, the user adjusts the position of the second projection image 160 so that the timepiece 100 is located inside the circular reference pattern 150. FIG. 9 shows the second projection image 160 after the user performs the position adjustment so that the timepiece 100 is located inside the reference pattern 150. As can be understood from the comparison between FIG. 9 and FIG. 6, since the position adjustment of the second projection image 160 is performed so that the timepiece 100 is located inside the circular reference pattern 150, the state corresponding to the initial installation of the projector 20 can be restored even when the projector 20 is reinstalled. Thus, when the projector 20 is reinstalled, the work load of the user during the alignment of the projector 20 by the user can be reduced.

Effects of Embodiment

As the control device 15 of the information processing device 10 executes the first processing and the second processing described above, the projection image adjustment method according to the present embodiment is implemented. That is, the projection image adjustment method according to the present embodiment includes: performing the first processing when the first operation is received, the first processing including causing the projector 20 to project the first projection image 140 including the test pattern 120, acquiring, from the projector 20, a geometric correction value obtained by performing geometric correction on the first projection image 140 projected on the wall surface 110 by the projector 20, generating the reference pattern 150 corresponding to the marking operation for marking an object on the wall surface 110 appearing in the first projection image 140 when the marking operation is received, and storing the relative positional relationship between the test pattern 120 and the reference pattern 150, and the geometric correction value, as one data set; and performing the second processing including causing the projector 20 to project the second projection image 160 including the reference pattern 150 when the second operation different from the first operation is received.

According to the present embodiment as described above, the user performs the position adjustment so that the position of the reference pattern 150 disposed in the second projection image 160 matches the position of the object on the wall surface 110 appearing in the second projection image 160 at the time of the position adjustment of the second projection image 160 projected on the wall surface 110 after the second operation is performed, and thus can restore the state corresponding to the initial installation of the projector 20 even when the projector 20 is reinstalled. Thus, when the projector 20 is reinstalled, the work load of the user during the alignment of the projector 20 by the user can be reduced.

In the projection image adjustment method according to the present embodiment, the second projection image 160 includes the test pattern 120 in addition to the reference pattern 150.

According to the present embodiment described above, the user can more easily perform the geometric correction and alignment of the second projection image 160.

In the projection image adjustment method according to the present embodiment, the test pattern 120 is a grid pattern.

According to the present embodiment, the user can more easily perform the geometric correction of the first projection image 140 and the second projection image 160.

In the projection image adjustment method according to the present embodiment, the color of the reference pattern 150 is different from the color of the area other than the reference pattern 150 in the area disposed in the second projection image 160.

According to the present embodiment, since the user can easily visually recognize the reference pattern 150, the user can more easily perform the geometric correction and alignment of the second projection image 160.

The information processing device 10 according to the present embodiment includes: the input device 13 that receives an input operation; and the control device 15 that executes the first processing when the first operation is received via the input device 13, the first processing including causing the projector 20 to project the first projection image 140 including the test pattern 120, acquiring, from the projector 20, a geometric correction value obtained by performing geometric correction on the first projection image 140 projected on the wall surface 110 by the projector 20, generating the reference pattern 150 corresponding to the marking operation for marking an object on the wall surface 110 appearing in the first projection image 140 when the marking operation is received, and storing the relative positional relationship between the test pattern 120 and the reference pattern 150, and the geometric correction value, as one data set, and the second processing including causing the projector 20 to project the second projection image 160 including the reference pattern 150 when the second operation different from the first operation is received via the input device 13.

With the information processing device 10 according to the present embodiment as described above, the user performs the position adjustment so that the position of the reference pattern 150 disposed in the second projection image 160 matches the position of the object on the wall surface 110 appearing in the second projection image 160 at the time of the position adjustment of the second projection image 160 projected on the wall surface 110 after the second operation is performed, and thus can restore the state corresponding to the initial installation of the projector 20 even when the projector 20 is reinstalled. Thus, when the projector 20 is reinstalled, the work load of the user during the alignment of the projector 20 by the user can be reduced.

The program according to the present embodiment causes a computer to execute: the first processing when the first operation is received, the first processing including causing the projector 20 to project the first projection image 140 including the test pattern 120, acquiring, from the projector 20, a geometric correction value obtained by performing geometric correction on the first projection image 140 projected on the wall surface 110 by the projector 20, generating the reference pattern 150 corresponding to the marking operation for marking an object on the wall surface 110 appearing in the first projection image 140 when the marking operation is received, and storing the relative positional relationship between the test pattern 120 and the reference pattern 150, and the geometric correction value, as one data set; and the second processing including causing the projector 20 to project the second projection image 160 including the reference pattern 150 when the second operation different from the first operation is received. In the present embodiment, the control device 15 is an example of the computer.

With the program according to the present embodiment as described above, the user performs the position adjustment so that the position of the reference pattern 150 disposed in the second projection image 160 matches the position of the object on the wall surface 110 appearing in the second projection image 160 at the time of the position adjustment of the second projection image 160 projected on the wall surface 110 after the second operation is performed, and thus can restore the state corresponding to the initial installation of the projector 20 even when the projector 20 is reinstalled. Thus, when the projector 20 is reinstalled, the work load of the user during the alignment of the projector 20 by the user can be reduced.

Note that the technical scope of the present disclosure is not limited to the embodiment described above, and various changes can be made thereto without departing from the spirit and scope of the present disclosure.

For example, in the above embodiment, the grid pattern is used as an example of the test pattern 120, but the test pattern according to the present disclosure is not limited to the grid pattern. For example, a pattern in which a plurality of cross lines are arranged vertically and horizontally at predetermined intervals may be used as the test pattern.

In step S1 in the present embodiment, the user manually performs the geometric correction by using the geometric correction function such as the keystone correction function of the projector 20, but the projector 20 may execute the geometric correction processing. The geometric correction processing includes, for example, a step in which the projector 20 acquires picked-up image data obtained by picking up the first projection image 140 projected on the wall surface 110, a step in which the projector 20 generates a geometric correction value, based on the picked-up image data, a step in which the projector 20 generates a signal obtained by correcting the first projection image 140, based on the geometric correction value, and a step in which the projector 20 projects the first projection image 140 after the geometric correction value onto the wall surface 110, based on the signal.

Summary of Present Disclosure

The present disclosure will be summarized below in the form of appendixes.

(Appendix 1) A projection image adjustment method includes: performing first processing when a first operation is received, the first processing including causing a projector to project a first projection image including a test pattern, acquiring, from the projector, a geometric correction value obtained by performing geometric correction on the first projection image projected on a projection surface by the projector, generating a reference pattern corresponding to a marking operation for marking an object on the projection surface appearing in the first projection image when the marking operation is received, and storing a relative positional relationship between the test pattern and the reference pattern, and the geometric correction value, as one data set; and performing second processing including causing the projector to project a second projection image including the reference pattern when a second operation different from the first operation is received.

With the projection image adjustment method according to Appendix 1, the user performs the position adjustment so that the position of the reference pattern disposed in the second projection image matches the position of the object on the projection surface appearing in the second projection image at the time of the position adjustment of the second projection image projected on the projection surface after the second operation is performed, and thus can restore the state corresponding to the initial installation of the projector even when the projector is reinstalled. Thus, when the projector is reinstalled, the work load of the user during the alignment of the projector by the user can be reduced.

(Appendix 2) In the projection image adjustment method according to Appendix 1, the second projection image includes the test pattern in addition to the reference pattern.

With the projection image adjustment method according to Appendix 2, the user can more easily perform the geometric correction and alignment of the second projection image.

(Appendix 3) In the projection image adjustment method according to Appendix 1 or 2, the test pattern is a grid pattern.

With the projection image adjustment method according to Appendix 3, the user can more easily perform the geometric correction of the first projection image and the second projection image.

(Appendix 4) In the projection image adjustment method according to one of Appendices 1 to 3, a color of the reference pattern is different from a color of an area other than the reference pattern in an area disposed in the second projection image.

With the projection image adjustment method according to Appendix 4, the user can easily visually recognize the reference pattern and therefore can more easily perform the geometric correction and alignment of the second projection image.

(Appendix 5) An information processing device includes: an input device that receives an input operation; and a control device that executes first processing when a first operation is received via the input device, the first processing including causing a projector to project a first projection image including a test pattern, acquiring, from the projector, a geometric correction value obtained by performing geometric correction on the first projection image projected on a projection surface by the projector, generating a reference pattern corresponding to a marking operation for marking an object on the projection surface appearing in the first projection image when the marking operation is received, and storing a relative positional relationship between the test pattern and the reference pattern, and the geometric correction value, as one data set, and second processing including causing the projector to project a second projection image including the reference pattern when a second operation different from the first operation is received via the input device.

With the information processing device according to Appendix 5, the user performs the position adjustment so that the position of the reference pattern disposed in the second projection image matches the position of the object on the projection surface appearing in the second projection image at the time of the position adjustment of the second projection image projected on the projection surface after the second operation is performed, and thus can restore the state corresponding to the initial installation of the projector even when the projector is reinstalled. Thus, when the projector is reinstalled, the work load of the user during the alignment of the projector by the user can be reduced.

(Appendix 6) A non-transitory computer-readable storage medium storing a program is provided, the program causing a computer to execute: first processing when a first operation is received, the first processing including causing a projector to project a first projection image including a test pattern, acquiring, from the projector, a geometric correction value obtained by performing geometric correction on the first projection image projected on a projection surface by the projector, generating a reference pattern corresponding to a marking operation for marking an object on the projection surface appearing in the first projection image when the marking operation is received, and storing a relative positional relationship between the test pattern and the reference pattern, and the geometric correction value, as one data set; and second processing including causing the projector to project a second projection image including the reference pattern when a second operation different from the first operation is received.

With the program according to Appendix 6, the user performs the position adjustment so that the position of the reference pattern disposed in the second projection image matches the position of the object on the projection surface appearing in the second projection image at the time of the position adjustment of the second projection image projected on the projection surface after the second operation is performed, and thus can restore the state corresponding to the initial installation of the projector even when the projector is reinstalled. Thus, when the projector is reinstalled, the work load of the user during the alignment of the projector by the user can be reduced.

What is claimed is:

1. A projection image adjustment method comprising:

performing first processing when a first operation is received, the first processing including causing a projector to project a first projection image including a test pattern, acquiring, from the projector, a geometric correction value obtained by performing geometric correction on the first projection image projected on a projection surface by the projector, generating a reference pattern corresponding to a marking operation for marking an object on the projection surface appearing in the first projection image when the marking operation is received, and storing a relative positional relationship between the test pattern and the reference pattern, and the geometric correction value, as one data set; and performing second processing including causing the projector to project a second projection image including the reference pattern when a second operation different from the first operation is received.

2. The projection image adjustment method according to claim 1, wherein the second projection image includes the test pattern in addition to the reference pattern.

3. The projection image adjustment method according to claim 1, wherein the test pattern is a grid pattern.

4. The projection image adjustment method according to claim 1, wherein a color of the reference pattern is different from a color of an area other than the reference pattern in an area disposed in the second projection image.

5. An information processing device comprising:

an input device that receives an input operation; and a control device that executes first processing when a first operation is received via the input device, the first processing including causing a projector to project a first projection image including a test pattern, acquiring, from the projector, a geometric correction value obtained by performing geometric correction on the first projection image projected on a projection surface by the projector, generating a reference pattern corresponding to a marking operation for marking an object on the projection surface appearing in the first projection image when the marking operation is received, and storing a relative positional relationship between the test pattern and the reference pattern, and the geometric correction value, as one data set, and second processing including causing the projector to project a second projection image including the reference pattern when a second operation different from the first operation is received via the input device.

6. A non-transitory computer-readable storage medium storing a program, the program causing a computer to execute:

first processing when a first operation is received, the first processing including causing a projector to project a first projection image including a test pattern, acquiring, from the projector, a geometric correction value obtained by performing geometric correction on the first projection image projected on a projection surface by the projector, generating a reference pattern corresponding to a marking operation for marking an object on the projection surface appearing in the first projection image when the marking operation is received, and storing a relative positional relationship between the test pattern and the reference pattern, and the geometric correction value, as one data set; and second processing including causing the projector to project a second projection image including the reference pattern when a second operation different from the first operation is received.

* * * * *